(12) United States Patent
Shu

(10) Patent No.: US 7,330,223 B2
(45) Date of Patent: Feb. 12, 2008

(54) ASSEMBLY AND ADJUSTMENT OF OPTICAL KERNEL FOR LCD PROJECTORS

(75) Inventor: Ting Hsien Shu, Tai-Chung Hsien (TW)

(73) Assignee: United Microdisplay Optronics Corp., Hsin-Chu (TW)

( * ) Notice: Subject to any disclaimer, the term of this patent is extended or adjusted under 35 U.S.C. 154(b) by 491 days.

(21) Appl. No.: 10/908,923

(22) Filed: Jun. 1, 2005

(65) Prior Publication Data

US 2006/0274222 A1 Dec. 7, 2006

(51) Int. Cl.
*G02F 1/1333* (2006.01)
*G02F 1/1335* (2006.01)
*G06F 1/16* (2006.01)

(52) U.S. Cl. .............................. 349/58; 349/5; 361/681

(58) Field of Classification Search .................. 349/58, 349/5; 361/679, 681
See application file for complete search history.

(56) References Cited

U.S. PATENT DOCUMENTS 5,703,665 A * 12/1997 Muramatsu et al. .......... 349/60
6,882,480 B2 * 4/2005 Yanagisawa ................. 359/634
7,137,705 B2 * 11/2006 Kitabayashi .................. 353/31

* cited by examiner

*Primary Examiner*—Mike Qi
(74) *Attorney, Agent, or Firm*—Winston Hsu

(57) ABSTRACT

The present invention discloses an improved optical kernel assembly for liquid crystal display (LCD) projectors, which includes a base frame; a top frame being arranged substantially in parallel with the base frame; a polarizing beam splitter (PBS) mounted between the base frame and the top frame; and a dustproof triangle frame/panel module assembly.

7 Claims, 11 Drawing Sheets

ASSEMBLY AND ADJUSTMENT OF OPTICAL KERNEL FOR LCD PROJECTORS

BACKGROUND OF INVENTION

1. Field of the Invention

The present invention relates to the assembly and adjustment of an optical kernel device suited for liquid crystal display (LCD) projectors.

2. Description of the Prior Art

Liquid Crystal Display (LCD) projectors are generally classified into two types, one type being a transmission-type LCD in which a desired display is achieved by observing, from a side of the facing substrate, light incident on the liquid crystal from a side of the TFT substrate, and the other type being a reflective-type LCD such as a liquid crystal-on-silicon (LCoS) projector in which a desired display is achieved by having light incident on the liquid crystal from the side of the facing substrate reflect on the side of the reflective substrate and by causing the light to be emitted from the side of the facing substrate.

When assembling optical elements, center of the optical axis and focusing or imaging position of the optical kernel device must be carefully adjusted. In some applications, the installation frames of the optical devices are designed as adjustable machinery. In some other applications, the adjustment (known as "POP" adjustment) or alignment of the optical kernel device is done by a pin-to-hole method.

FIGS. 1-5 illustrates the assembling process and the pin-to-hole adjustment method of a three-panel optical kernel assembly according to the prior art, wherein FIG. 1 is an exploded perspective view of parts of an optical kernel assembly 10; FIG. 2 is a perspective view of an optical kernel assembly 10 before the installation of the liquid crystal panel; FIG. 3 is a perspective view of an optical kernel assembly after the installation of the liquid crystal panel; FIG. 4 is a perspective view of an optical kernel assembly after pin-to-hole adjustment; and FIG. 5 is a perspective view of an optical kernel assembly after adhesive strip sealing.

As shown in FIG. 1, optical kernel assembly 10 comprises a base frame 20, a top frame 30, a polarizing beam splitter (PBS) 40 mounted between the base frame 20 and the top frame 30, triangle frame 50, upper positioning piece 60, lower positioning piece 70, liquid crystal panel 80, and snap fastener 90. The base frame 20 further comprises a front bracket portion 22 for installation of a projection lens (not shown). The PBS 40 is mounted on a center position of a rear stage 24 of the base frame 20. 45-degree projections 25 are provided on the rear stage 24.

Typically, triangular venting holes 26 for heat dissipation are disposed next to the 45-degree projections 25. The top frame 30 has similar triangular venting holes 36 corresponding to the triangular venting holes 26. Further, along one side of each triangular venting hole 36, a slot 34 is provided, thereby forming a rib 38 between the slot 37 and each triangular venting hole 36.

The triangle frame 50 has three vertical faces and two horizontal faces. Initially, two optical glass plates 54 are mounted on two faces of the three vertical faces, temporally leaving one face thereof open. The open face of the triangle frame 50 will be covered with the liquid crystal panel 80 in a later stage. The upper horizontal face of the triangle frame 50 has a recess 52 such that a slim protrusion 58 is formed on the upper horizontal face of the triangle frame 50.

The upper positioning piece 60 comprises two positioning pins 62. The upper positioning piece 60 further has a bent portion 61 on which two screw apertures 64 are provided. The lower positioning piece 70 comprises two positioning pins 72 and two screw apertures 74. The liquid crystal panel 80 has corner holes 82 corresponding to the positioning pins 62 and 72.

As shown in FIG. 2, the triangle frame 50 is mounted between the top frame 30 and the base frame 20. The triangle frame 50 leans against the 45-degree projection 25 at its bottom and is fixed by the snap fastener 90 through the venting hole 36 and the slot 37. The snap fastener 90 clamps the rib 38 of the top frame 30 and the slim protrusion 58 of the triangle frame 50 together. After installing the triangle frame 50, the upper positioning piece 60 and the lower positioning piece 70 are screwed onto the top frame 30 and the base frame 20, respectively, by screws.

As shown in FIG. 3, the liquid crystal panel 80 is then mounted onto the optical kernel with the pins 62 and 72, and the other two panels (not shown) are subsequently mounted onto the optical kernel with respect to the other two faces of the PBS in the same manner. After the three panels are mounted, a modulation step is performed to stack color images of the three panels and focus the images on the lens. Ordinarily, a six-axis adjustment jig is adopted to assist on the modulation step.

As shown in FIG. 4, after the three color images emitted from the respective three panels are stacked, the three panels are fixed on the optical kernel using ultra violet seal or weld 120.

Finally, as shown in FIG. 5, the inner space of the triangle frame 50 and the panel peripheral are sealed with an adhesive strip 130 in order to prevent dust or particles from entering the triangle frame 50. The above-described prior art is disadvantageous because when the ultra violet seal shrinks or other parts shrink or expand with the temperature, multidirectional cumulative tolerance occurs in the conventional assembly and leads to image misalignment.

In addition, it requires much time to adjust three panels so as to stack three images and may lag the fabrication. Furthermore, the above-described prior art is not reliable because particles or dust are often introduced during the assembly process before sealing the panel peripheral.

Further, the prior art pin-to-hole method needs snap fasteners to manually fix the triangle frame before the assembly of the liquid crystal panel, leading to extra cost and time.

SUMMARY OF INVENTION

It is therefore a primary objective of the claimed invention to provide improved assembly and adjustment method of an optical kernel device suited for liquid crystal display (LCD) projectors in order to solve the above-described prior art problems.

It is another objective of the claimed invention to provide an improved pin-to-hole method for assembling the optical kernel device. The positioning holes for positioning the LCD panel or focal positions are no longer disposed on the LCD panel's corners, but disposed on the dustproof triangle frame/panel module.

It is still another objective of the claimed invention to provide a simplified pin-to-hole method for assembling the optical kernel device, wherein snap fasteners and the step of sealing the panel peripheral are omitted.

According to the claimed invention, the present invention discloses an improved optical kernel assembly for liquid crystal display (LCD) projectors, which includes a base frame; a top frame being arranged substantially in parallel with the base frame; a polarizing beam splitter (PBS) mounted between the base frame and the top frame; and a dustproof triangle frame/panel module assembly that includes a monolithic triangle frame body comprising a panel rabbet defined by two parallel side projection features and a bottom projection strip, wherein the triangle frame body has three vertical faces and two horizontal faces, and the side projection features span between the two horizontal faces at the rims of a first vertical face of the triangle frame body; and a panel module being set in the panel rabbet of the triangle frame body and sealing the first vertical face.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
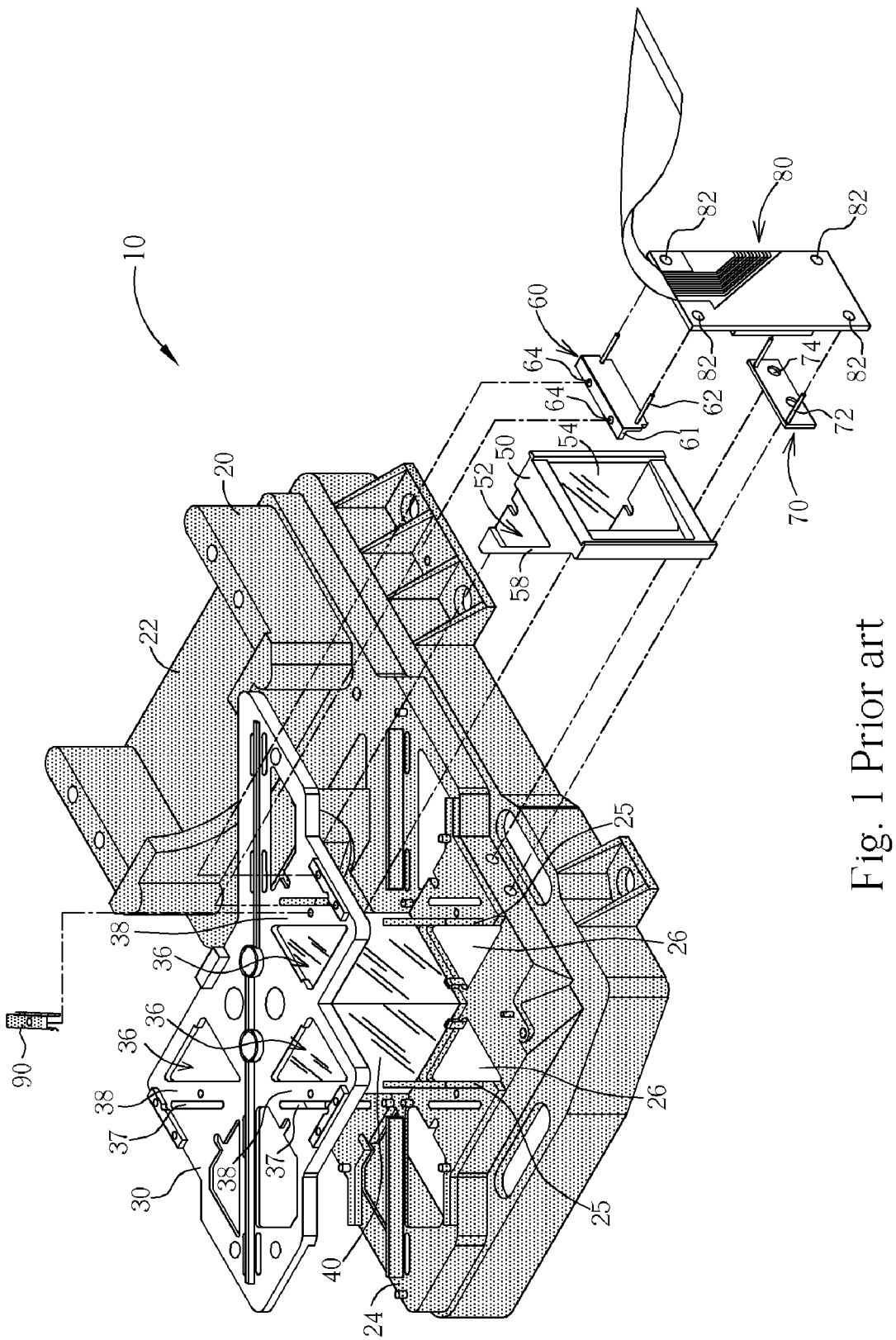
FIG. 1 is an exploded perspective view of parts of an optical kernel assembly according to the prior art.
Figure 2:
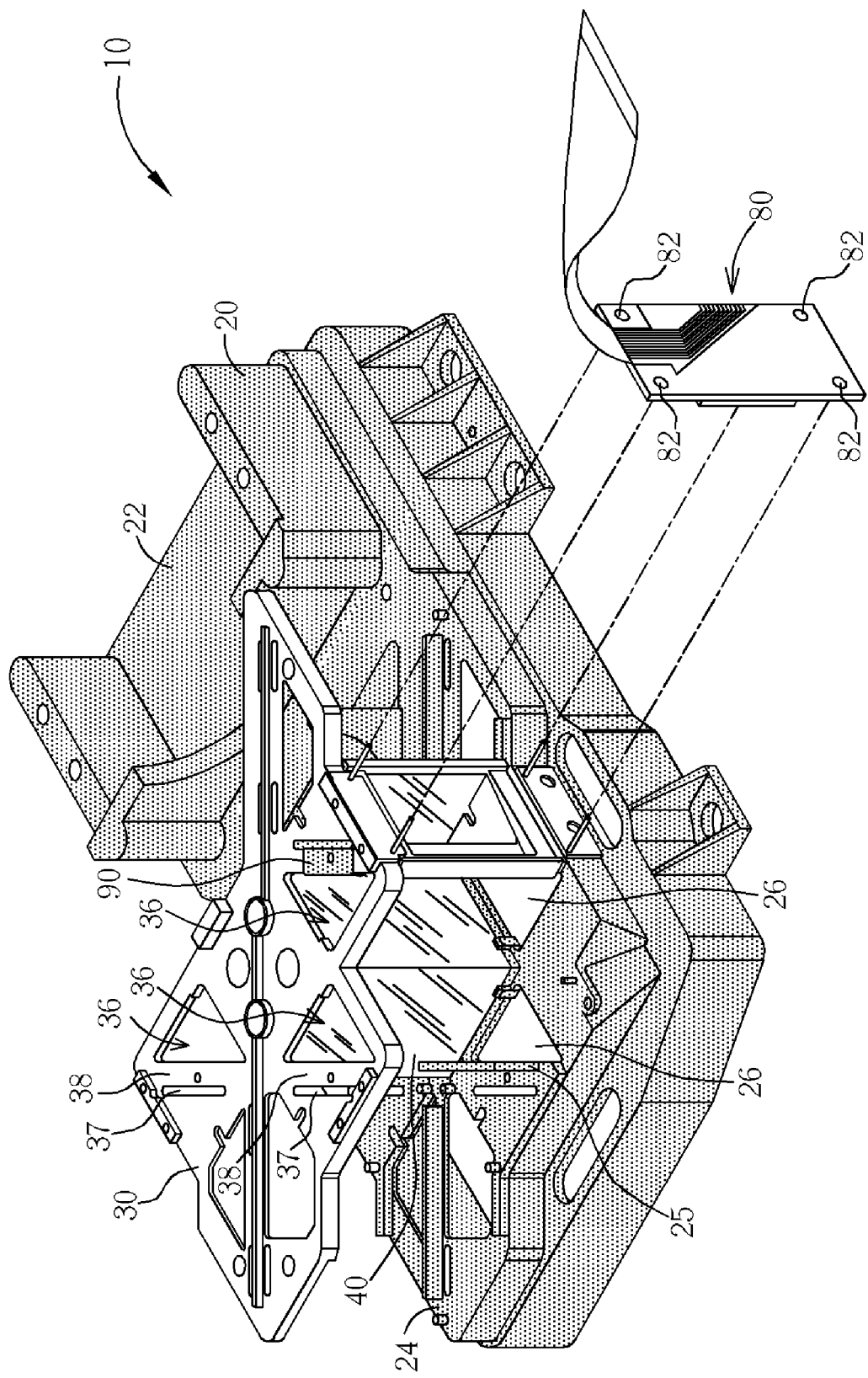
FIG. 2 is a perspective view of an optical kernel assembly before the installation of the liquid crystal panel according to the prior art.
Figure 3:
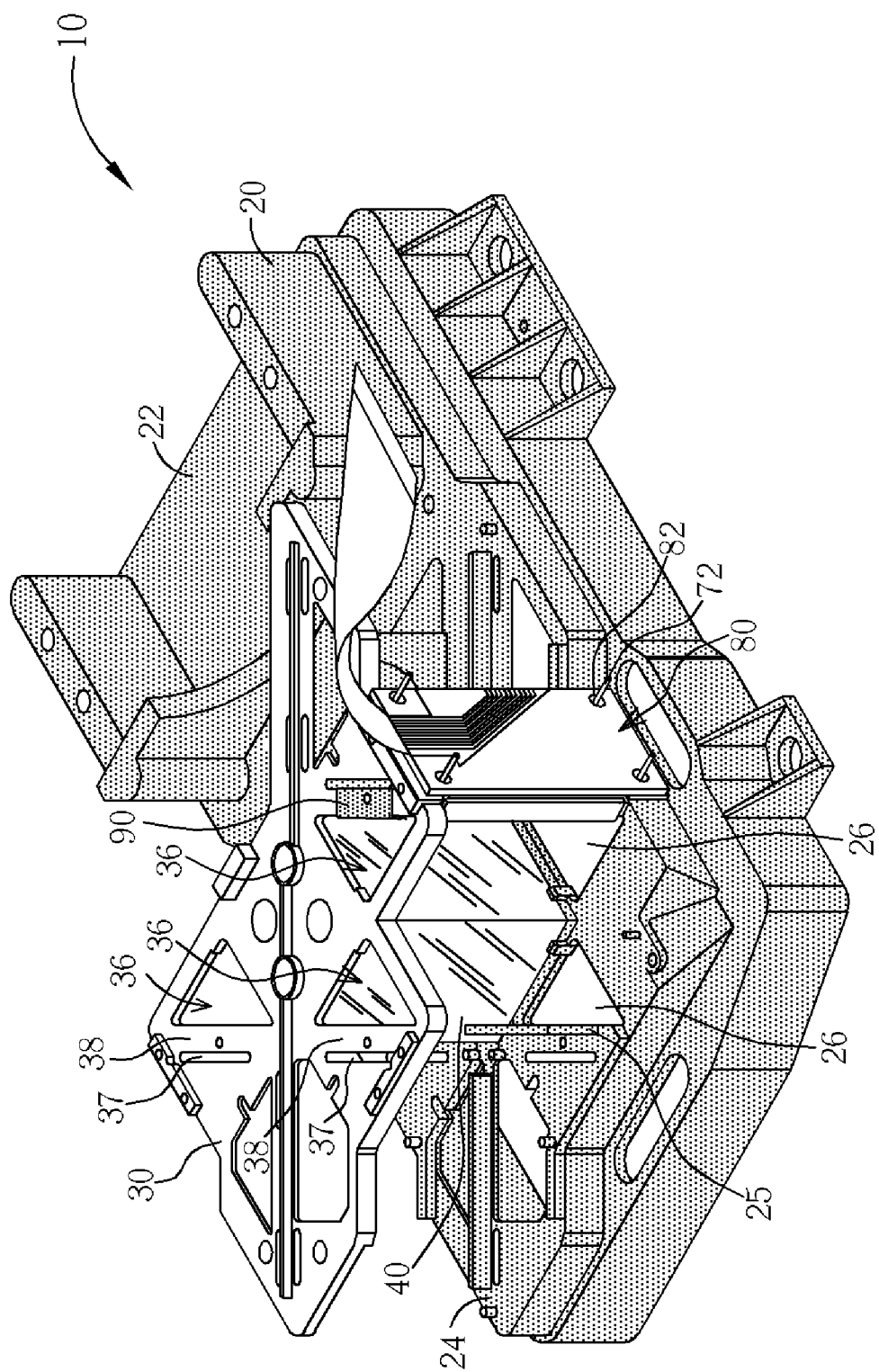
FIG. 3 is a perspective view of an optical kernel assembly after the installation of the liquid crystal panel according to the prior art.
Figure 4:
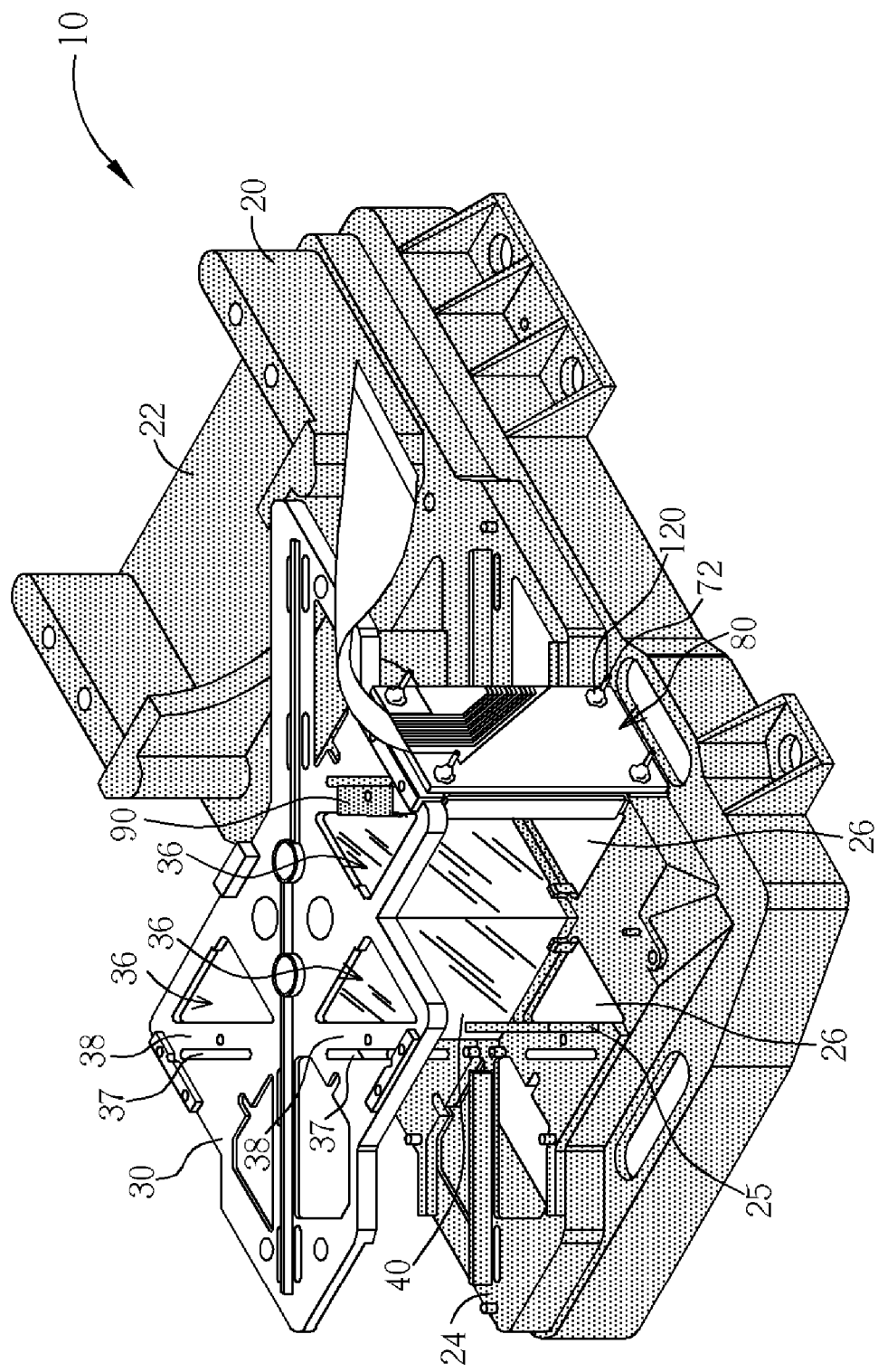
FIG. 4 is a perspective view of an optical kernel assembly after pin-to-hole adjustment according to the prior art.
Figure 5:
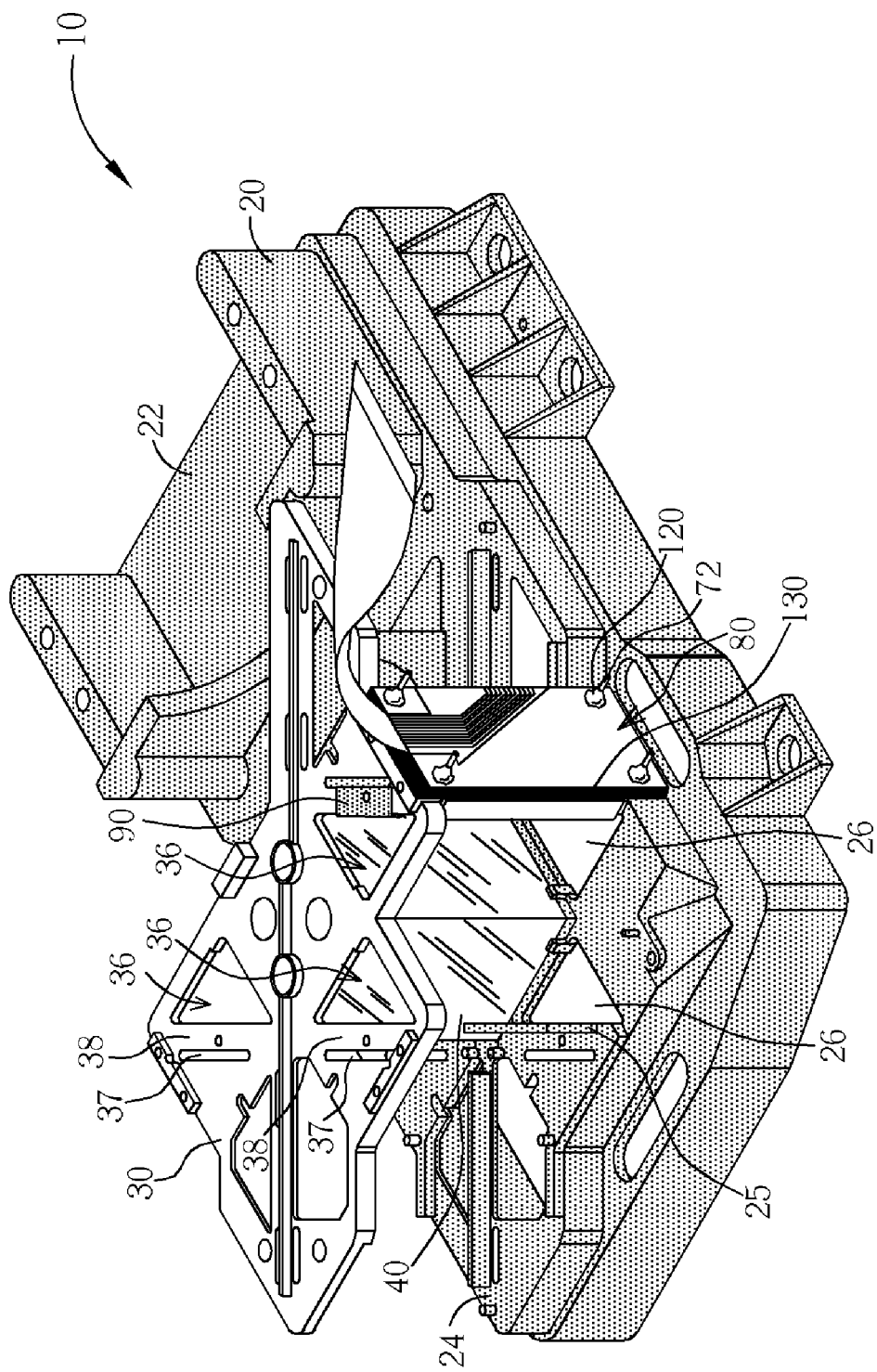
FIG. 5 is a perspective view of an optical kernel assembly after adhesive strip sealing according to the prior art.

The present invention pertains to an improved dustproof triangle frame/panel module assembly and a simplified pin-to-hole method for assembling the optical kernel device.

With the use of the modified dustproof triangle frame/panel module assembly that tightly combines the panel module with the dustproof triangle frame body, the snap fasteners as used in the prior art and the troublesome panel peripheral sealing process can be omitted, thereby simplifying the pin-to-hole method for assembling the optical kernel device.

In describing the preferred embodiment of the present invention, reference will be made herein to FIGS. 6-11 of the drawings. Features of the invention are not necessarily drawn to scale in the drawings.

Figure 6:
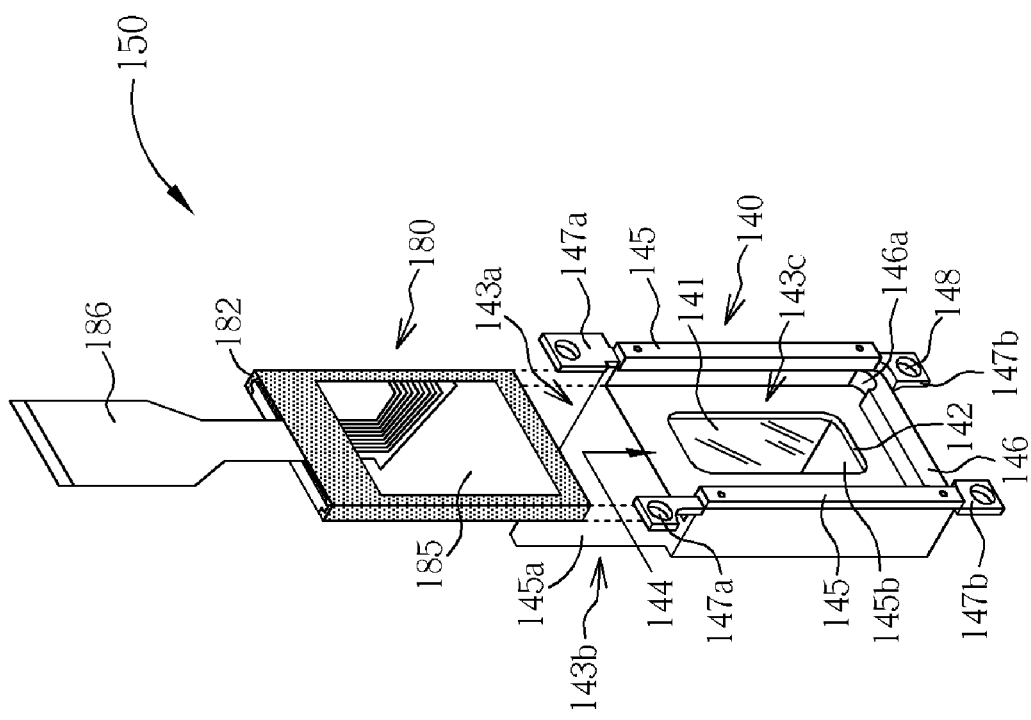
FIG. 6 is an exploded perspective view of the improved dustproof triangle frame/panel module according to one preferred embodiment of this invention.
Figure 7:
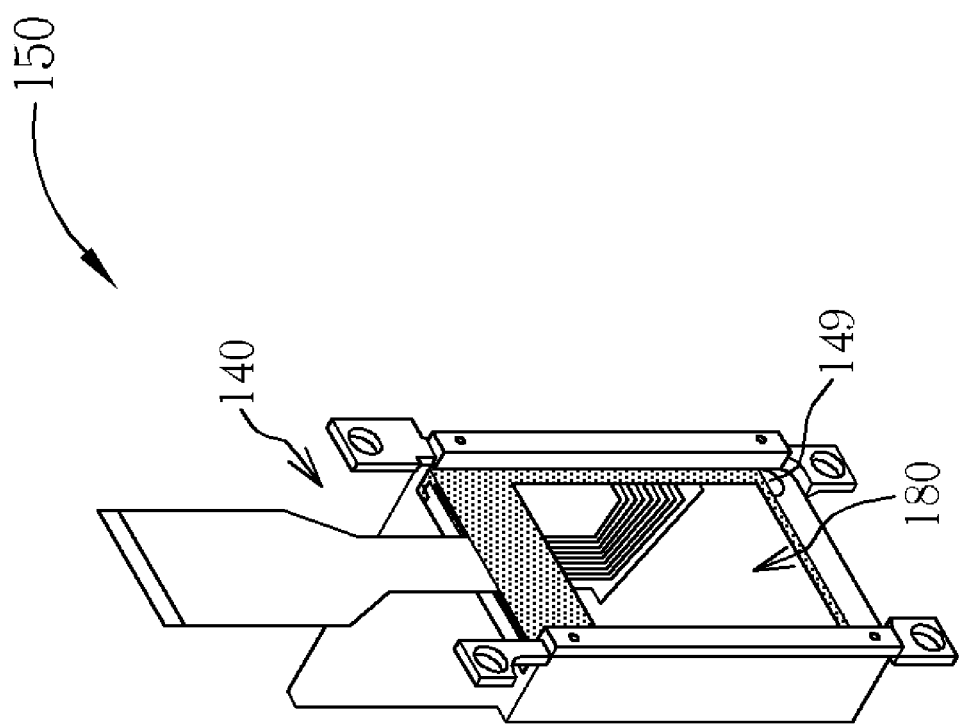
FIG. 7 is a perspective view of the improved dustproof triangle frame/panel module after the panel module is mounted on the dustproof triangle frame according to one preferred embodiment of this invention.

Please refer to FIGS. 6 and 7. FIG. 6 is an exploded perspective view of the improved dustproof triangle frame/panel module assembly 150 according to one preferred embodiment of this invention. FIG. 7 is a perspective view of the improved dustproof triangle frame/panel module assembly after the panel module is set in the panel rabbet of the triangle frame body according to one preferred embodiment of this invention.

As shown in FIG. 6, the dustproof triangle frame/panel module assembly 150 comprises a monolithic triangle frame body 140 and a panel module 180 to be set in a panel rabbet 144 of the triangle frame body 140. The monolithic triangle frame body 140 may be made of metals or alloys. Likewise, the triangle frame body 140 has three vertical faces 143a, 143b, and 143c and two horizontal faces 145a and 145b.

Each vertical face has an aperture 142 that allows light signal to pass therethrough. Initially, an optical glass plate 141 is attached to each of the first vertical face 143a and second vertical face 143b, temporally leaving the third vertical face 143c open.

It is noted that the aperture 142 on the third vertical face corresponds to the position of the liquid crystal panel such as an LCoS panel. Further, there is no recess formed on the horizontal face 145a.

The panel rabbet 144 is defined by two parallel side projection features 145 spanning between the horizontal faces 145a and 145b at the rims of the third vertical face 143c, and a bottom projection strip 146. Two concavities 146a are provided near the ends of the bottom projection strip 146. The panel rabbet 144 has one opening end for fittingly receiving the panel module 180.

The panel module 180 comprises a solid cassette 182 and a liquid crystal panel 185 that is fittingly set in the cassette 182. The cassette 182 tightly encapsulates the liquid crystal panel 185. According to the preferred embodiment of this invention, the cassette 182 is made of like material as the triangle frame body 140, but not limited thereto. The flat flexible cable 186, which electrically connects with the liquid crystal panel 185, is folded and protrudes from the top of the panel module 180. The liquid crystal panel 185 used in the present invention may be LCD panels or LCoS panels. If LCD panels are adopted, the images are projected by transmission. If LCoS panels are adopted, the images are projected by reflection.

Four positioning lugs including two upper lugs 147a and two bottom lugs 147b protrude from the distal ends of the side projection features 145. Each lug has an aperture 148 for the subsequent pin-to-hole adjustment.

As shown in FIG. 7, and briefly back to FIG. 6, the third vertical face 143c of the triangle frame body 140 is covered with and sealed by the panel module 180. When assembling the panel module 180 and the triangle frame body 140, the panel module 180 slides from the opening end of the panel rabbet 144 into the panel rabbet 144, and leans against the bottom projection strip 146.

The panel module 180 is affixed in the panel rabbet 144 by applying glue 149 to the concavities 146a. Since the three vertical faces 143a, 143b and 143c are sealed using optical glass plates and the panel module 180, respectively, dust or particles will not enter the triangle frame body 140.

Figure 8:
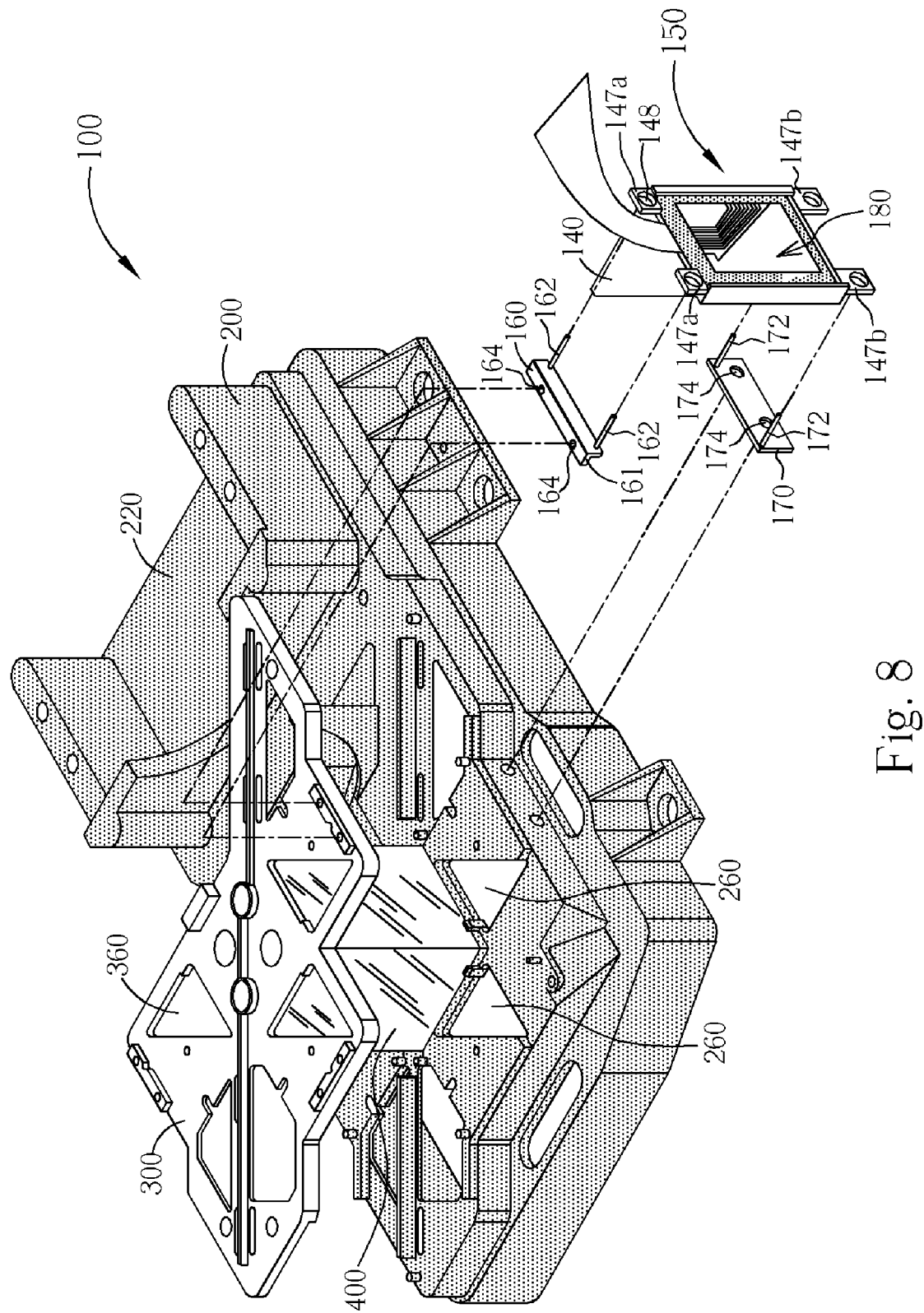
FIG. 8 is an exploded perspective view of parts of an optical kernel assembly of this invention.
Figure 9:
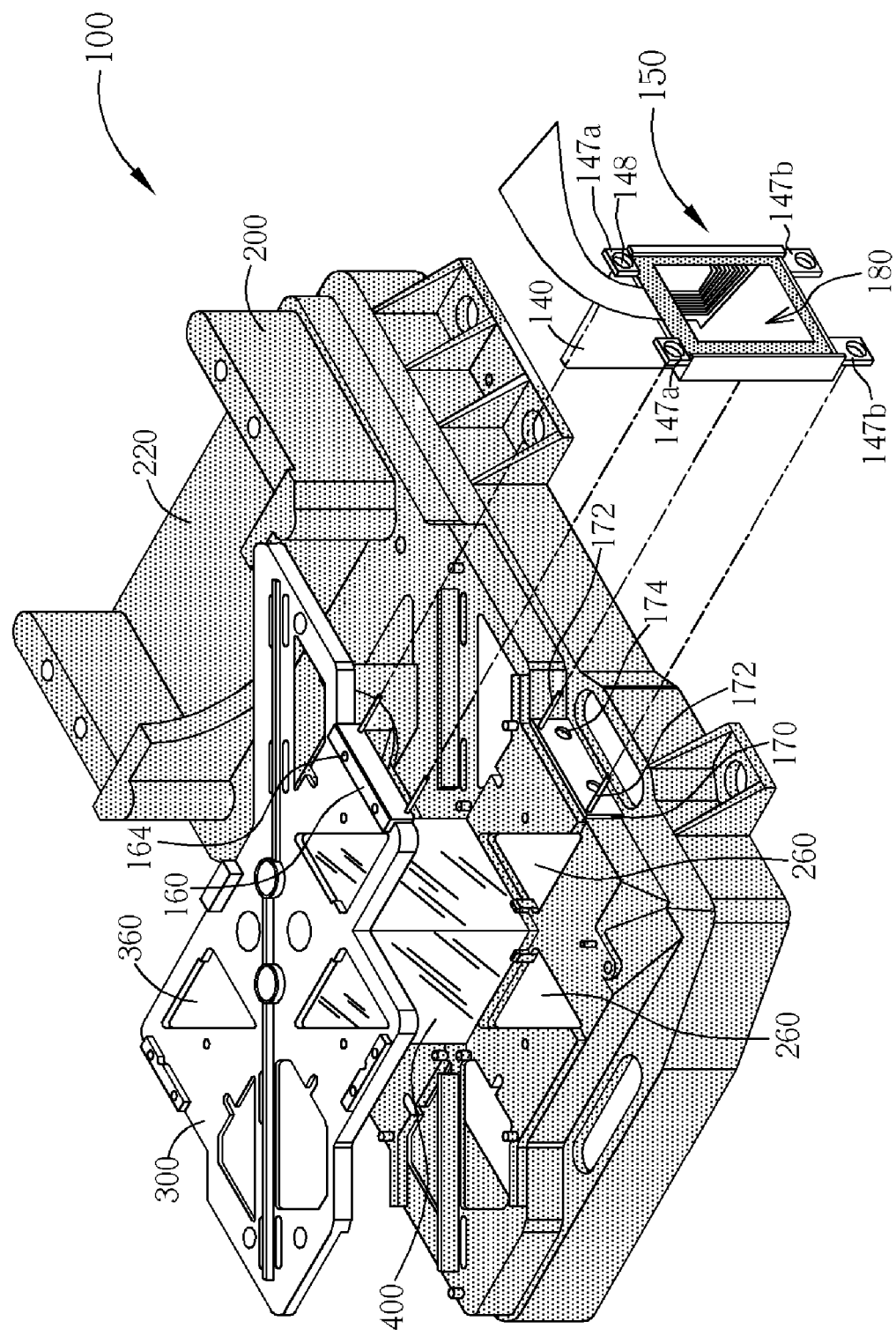
FIG. 9 is a perspective view of an optical kernel assembly before the installation of the dustproof triangle frame/panel module assembly.
Figure 10:
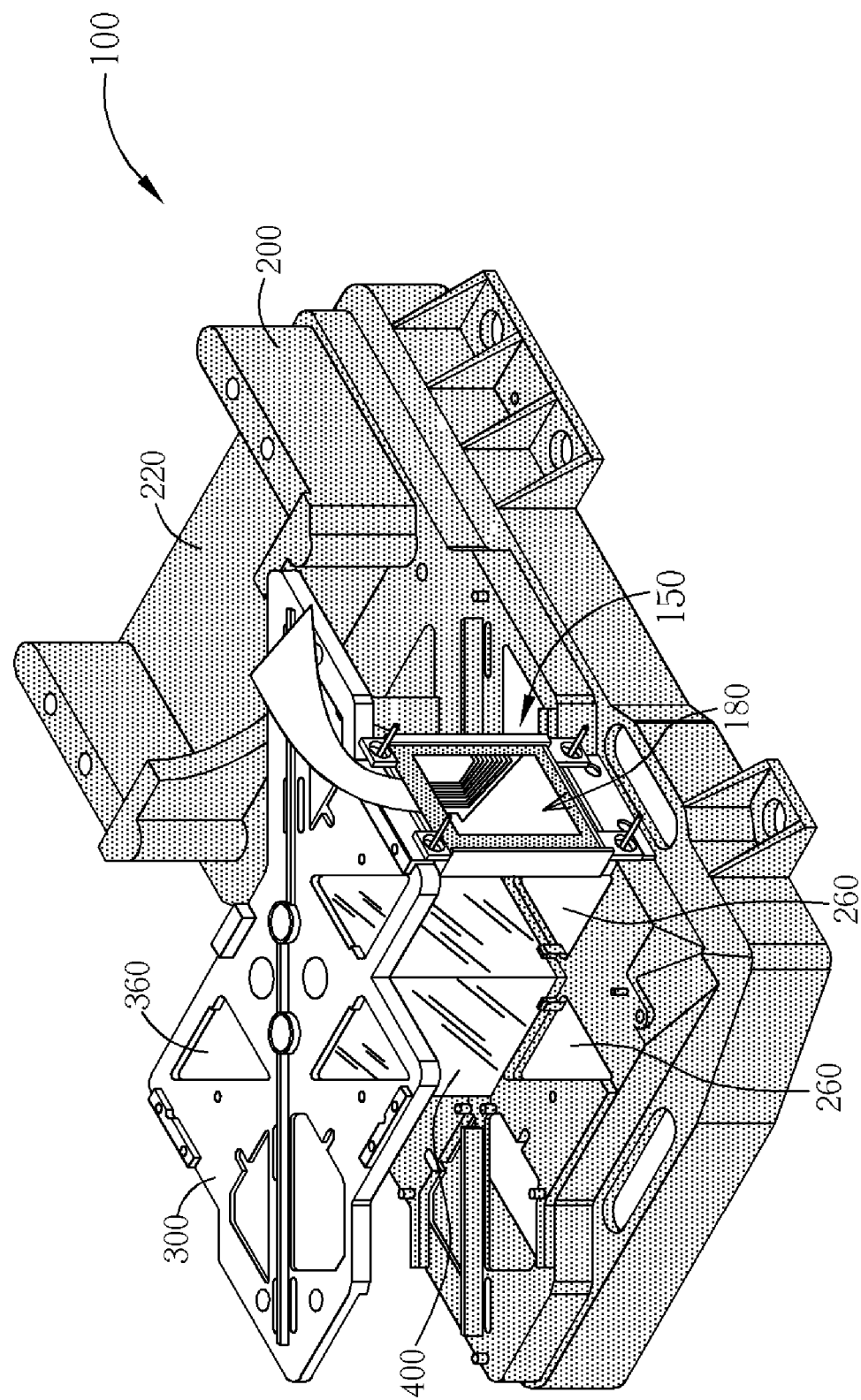
FIG. 10 is a perspective view of an optical kernel assembly after the installation of the dustproof triangle frame/panel module assembly.
Figure 11:
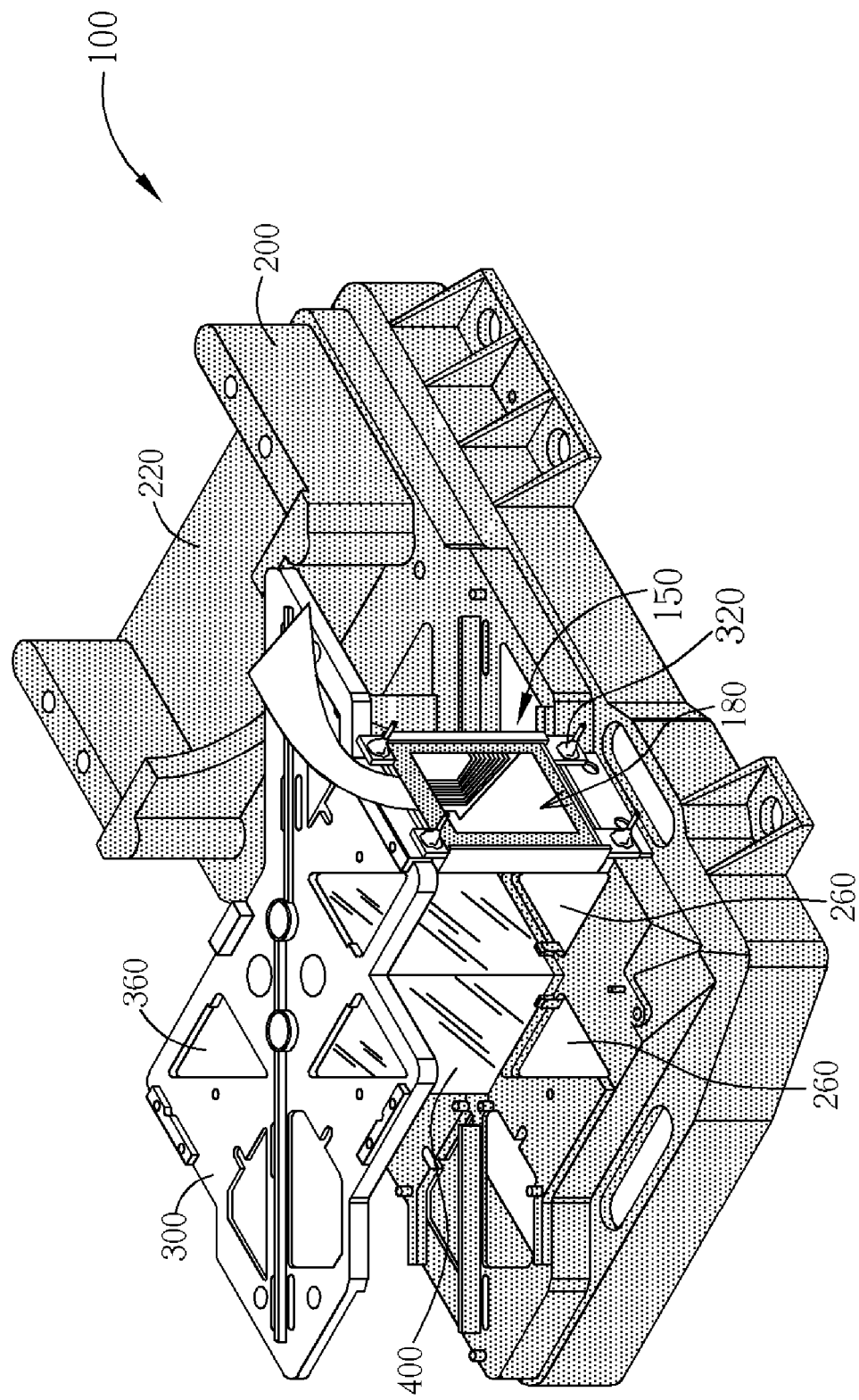
FIG. 11 is a perspective view of an optical kernel assembly after pin-to-hole adjustment and welding.

Please refer to FIGS. 8-11. FIGS. 8-11 illustrates the assembling process and the pin-to-hole adjustment method of a three-panel optical kernel assembly according to one preferred embodiment of the present invention, wherein FIG. 8 is an exploded perspective view of parts of an optical kernel assembly 100 of this invention; FIG. 9 is a perspective view of an optical kernel assembly 100 before the installation of the dustproof triangle frame/panel module assembly 150; FIG. 10 is a perspective view of an optical kernel assembly after the installation of the dustproof triangle frame/panel module assembly 150; and FIG. 11 is a perspective view of an optical kernel assembly after pin-to-hole adjustment and welding.

The optical kernel in this embodiment includes a plurality of color filters. The color filters are pervious to light or reflect light selectively. In another words, the color filters, while in a specific direction, are pervious to or reflect light with a specific color, such as pervious to red light and reflecting green light in a given direction. This characteristic enables the optical kernel to allow images to pass through the optical kernel or to reflect images based on the colors of the images and thus focus them on the lens.

Though three panels are adopted to illustrate the preferred embodiment of the present invention, however, two or more panels may be adopted in actual practice depending on the arrangement of the panels and the optical kernel.

As shown in FIG. 8, optical kernel assembly 100 comprises a base frame 200, a top frame 300 being arranged substantially in parallel with the base frame 200, a polarizing beam splitter (PBS) 400 mounted between the base frame 200 and the top frame 300, dustproof triangle frame/panel module assembly 150, upper positioning piece 160 and lower positioning piece 170. The base frame 200 further comprises a front bracket portion 220 for installation of a projection lens (not shown). The PBS 400 is mounted on a center position of a rear stage of the base frame 200.

Compared to the above-described prior art, 45-degree projections for positioning the triangle frame are no longer needed on the rear stage.

Triangular venting holes 260 for heat dissipation are disposed on the rear stage. The top frame 300 has similar triangular venting holes 360 corresponding to the triangular venting holes 260. Compared to the above-described prior art, slot along one side of each triangular venting hole 360 is no longer needed. It is noteworthy that the snap fasteners as used in the prior art for clamping the triangle frame body with the top frame are omitted.

The upper positioning piece 160 comprises two positioning pins 162 corresponding to the apertures 148 of the two upper lugs 147a of the dustproof triangle frame/panel module assembly 150. The upper positioning piece 160 further has a bent portion 161 on which two screw apertures 64 are provided. The lower positioning piece 170 comprises two positioning pins 172 corresponding to the apertures 148 of the two bottom lugs 147b of the dustproof triangle frame/panel module assembly 150, and two screw apertures 174.

As shown in FIG. 9, the upper positioning piece 160 and the lower positioning piece 170 are screwed onto the top frame 300 and the base frame 200, respectively, using screws (not shown).

As shown in FIG. 10, the dustproof triangle frame/panel module assembly 150 is then mounted onto the optical kernel with respect to the pins 162 and 172, and the other two dustproof triangle frame/panel module assemblies (not shown) are subsequently mounted onto the optical kernel with respect to the other two faces of the PBS in the same manner.

After the three triangle frame/panel module assemblies are in position, a modulation step or pin-to-hole adjustment is performed to stack color images of the three panels and focus the images on the lens. Ordinarily, a six-axis adjustment jig is adopted to assist on the modulation step. During the pin-to-hole adjustment, the triangle frame/panel module assembly 150 is not affixed to the top frame, but movable and adjustable using the six-axis adjustment jig.

As shown in FIG. 11, after the color images emitted from the respective three panels are stacked, the triangle frame/panel module assembly 150 is fixed on the optical kernel by weld 320.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical kernel assembly for liquid crystal display (LCD) projectors, comprising:
    a base frame;
    a top frame being arranged substantially in parallel with the base frame;
    a polarizing beam splitter (PBS) mounted between the base frame and the top frame; and
    a dustproof triangle frame/panel module assembly comprising:
    a monolithic triangle frame body comprising a panel rabbet defined by two parallel side projection features and a bottom projection strip, wherein the triangle frame body has three vertical faces and two horizontal faces, and the side projection features span between the two horizontal faces at the rims of a first vertical face of the triangle frame body; and
    a panel module being set in the panel rabbet of the triangle frame body and sealing the first vertical face.

2. The optical kernel assembly for LCD projectors according to claim 1 wherein the bottom projection strip has at least one concavity feature, and wherein the panel module is affixed in the panel rabbet by applying glue to the concavity feature.

3. The optical kernel assembly for LCD projectors according to claim 1 wherein the panel module comprises a solid cassette and a liquid crystal panel that is fittingly set in the cassette, which tightly encapsulates the liquid crystal panel.

4. The optical kernel assembly for LCD projectors according to claim 1 wherein each of the three vertical faces has an aperture that allows light signal to pass therethrough.

5. The optical kernel assembly for LCD projectors according to claim 1 wherein the dustproof triangle frame/panel module assembly further comprises optical glass plates attached to the other two vertical faces.

6. The optical kernel assembly for LCD projectors according to claim 1 wherein the dustproof triangle frame/panel module assembly further comprises four positioning lugs protruding from distal ends of the side projection features.

7. The optical kernel assembly for LCD projectors according to claim 6 wherein each lug has a through hole for subsequent pin-to-hole adjustment.

* * * * *